United States Patent [19]

Harris et al.

[11] E Re. 30,612

[45] Reissued May 12, 1981

[54] POLYURETHANE-MODIFIED ALKYD RESIN

[75] Inventors: Robert R. Harris, Burnham; Warren J. Pollack, Carpentersville, both of Ill.

[73] Assignee: International Minerals & Chemical Corp., Terre Haute, Ind.

[21] Appl. No.: 93,357

[22] Filed: Nov. 13, 1979

Related U.S. Patent Documents

Reissue of:

[64] Patent No.: 4,116,902
Issued: Sep. 26, 1978
Appl. No.: 839,718
Filed: Oct. 5, 1977

[51] Int. Cl.[3] ..... C09D 3/64; C09D 5/08

[52] U.S. Cl. ..... 260/22 TN; 260/22 M

[58] Field of Search ..... 260/22 TN, 22 M

[56] References Cited

U.S. PATENT DOCUMENTS

| | | | |
|---|---|---|---|
| 3,318,828 | 5/1967 | Seiner | 260/22 TN |
| 3,345,313 | 10/1967 | Ruhf et al. | 260/22 M |
| 3,380,942 | 4/1968 | Menke | 260/22 M |
| 3,471,425 | 10/1969 | Ehring et al. | 260/22 TN |
| 3,487,034 | 12/1969 | Mallios | 260/22 M |
| 3,491,011 | 1/1970 | LeBras et al. | 260/29.2 UA |
| 3,498,940 | 3/1970 | Laganis | 260/22 TN |
| 3,752,778 | 8/1973 | Dhein et al. | 260/22 TN |
| 3,847,851 | 11/1974 | Tugukuni et al. | 260/23 P |
| 3,894,978 | 7/1975 | Montesissa et al. | 260/22 CB |

FOREIGN PATENT DOCUMENTS

| | | |
|---|---|---|
| 1048893 | 11/1966 | United Kingdom . |
| 1117875 | 6/1968 | United Kingdom . |

*Primary Examiner*—Ronald W. Griffin
*Attorney, Agent, or Firm*—Robert H. Dewey

[57] ABSTRACT

A polyurethane-modified alkyd resin obtained by the process consisting of the steps (a) forming an alkyd resin by reacting an unsaturated fatty acid with an aromatic dicarboxylic acid or anhydride, and dimethylolpropionic acid with an excess of polyol, and (b) reacting the alkyd so formed with toluene diisocyanate.

8 Claims, No Drawings

POLYURETHANE-MODIFIED ALKYD RESIN

Matter enclosed in heavy brackets [ ] appears in the original patent but forms no part of this reissue specification; matter printed in italics indicates the additions made by reissue.

SUMMARY OF THE INVENTION

This invention relates to a polyurethane-modified alkyd resin. In a particular aspect, this invention relates to a water-soluble resin having superior fast-dry properties when deposited from aqueous solution.

It is an object of this invention to provide a water-soluble polyurethane-modified alkyd resin.

It is another object of this invention to provide a water-soluble resin having improved drying and anti-corrosion characteristics when deposited from an aqueous solution.

Other objects of this invention will be apparent to those skilled in the art from the disclosure herein.

It is the discovery of this invention to provide a water-soluble, polyurethane-modified alkyd resin obtained by the process consisting of the steps of (a) forming an alkyd resin having excess hydroxy groups by reacting at elevated temperatures a fatty acid having 10–20% conjugated unsaturation with an aromatic dicarboxylic acid or anhydride and dimethylolpropionic acid with a stoichiometrically excess amount of a polyol, and (b) reacting at elevated temperatures the alkyd resin so formed with toluene diisocyanate thereby forming a polyurethane-modified alkyl resin which, when neutralized with a metal hydroxide, ammonia, or amine, is water-soluble.

DETAILED DISCUSSION

In forming the alkyd resin of this invention, an unsaturated vegetable oil acid, an aromatic dicarboxylic acid or anhydride and dimethylolpropionic acid is reacted with an excess of polyol.

Vegetable oil acids suitable for use in the practice of this invention include aliphatic, unsaturated fatty acids or mixtures thereof, such as oleic, linoleic, or linolenic acid. Preferred acids include, but are not limited to, linoleic acid, tall oil fatty acids and linseed oil fatty acids. Both acids are well-known to those skilled in the art. Tall oil fatty acids are particularly preferred. They are derived from tall oil, which is a by-product of the paper industry. Also, dehydrated castor oil, tung oil fatty acids and soybean fatty acids can be used.

The amount of vegetable oil acid used is generally from about 30–48% by weight, preferably 30–36% based on total ingredients; 31–33% is particularly preferred. Although tall oil fatty acids are preferred for the practice of this invention, linseed fatty acids or linoleic acid can also be used.

Suitable aromatic dicarboxylic acids or anhydrides thereof include isophthalic acid and tetrahydrophthalic acid or anhydride, but the preferred acid is phthalic anhydride. The amount of aromatic dicarboxylic acid can vary from about 21–30% of total ingredients, preferably about 23–28%; 24–27% is particularly preferred.

Dimethylolpropionic acid is known in the art and is commercially available. The usual commercial grade is suitable for the practice of this invention. It is used in amounts of about 4–11%, but 8.5–10.5% is preferred, and 9–10% is particularly preferred.

The polyols—other than dimethylolpropionic acid—suitable for the practice of this invention include those polyhydric alcohols having two or more hydroxy groups per molecule, of which there are many known in the art, or mixtures thereof, such as trimethylpentanediol, diethylene glycol, neopentylglycerol, glycerol, pentaerythritol, trimethylolethane, trimethylolpropane and the like. In a preferred embodiment, the polyol is supplied by [trimethylpantanediol] *trimethylpentanediol* 17–24%, preferably 19–22%, and 20–21% is particularly preferred, and trimethylolethane, 11–15%, of the latter, 11–13% is preferred.

The alkyd portion of the resin is prepared by charging the dihydroxyalkane, vegetable fatty acid and phthalic anhydride to a reaction vessel and introducing a nitrogen atmosphere. The charge is heated gently to about 80° C. and as soon as melting begins, agitation is started. Then the trihydroxyalkane, dimethylolpropionic acid and dibutyl tin oxide catalyst are added. The reaction vessel is sealed and the contents are heated slowly to about 210° C. and held there until an acid number of 52–57 is obtained and the viscosity at 125° C. is 0.8–1.2 poise. The mixture is cooled to about 160° C. and alkyl aromatic solvent is added. The mixture is further cooled to about 82° C. and the ketone is added. The mixture is further cooled to about 65° C. and over a period of, e.g. two hours, an aromatic diisocyanate, e.g. toluene diisocyanate (TDI), is introduced, taking care not to allow too much foam to develop and keeping the temperature below 82° C. If necessary to obtain a more rapid cure, add an additional increment of TDI. A convenient cure test method is to heat a hot plate to 200° C. A small amount of resin is dropped onto the plate and spread thereon. The time required for the resin to gel is taken as the cure time. After all the TDI has been added, the mixture is heated for about an additional 1.5 hours at 100°–105° C. until a 35–50 sec. cure time is obtained. Butoxyethanol is then added and the mixture is discharged into a solvent composed, preferably but not necessarily, of butoxyethanol and isobutyl alcohol in about a 2.5–3.0:1 ratio.

For use in the preparation of water-soluble coatings the acidic resin prepared by the foregoing process is neutralized with ammonia or an amine, as is known in the art, to provide a water-soluble resin. The use of ammonia and amines to solubilize acidic resins is well-known in the art and any of the known methods can be used. The step of neutralizing the resin is not regarded as a part of the invention.

The urethane-modified alkyd resin of this invention has particular utility as a fast, air-dry, water-soluble resin for anti-corrosion primers and tough, mar-resistant topcoats, either pigmented or clear, on metal or wood.

The invention will be better understood with reference to the following examples. It is understood, however, that the examples are intended only to illustrate the invention and that it is not intended that the invention be limited thereby.

EXAMPLE 1

To a reaction kettle equipped with a heat source, a cooling source, an agitator, a reflux condenser with a receiver and temperature-sensing means was added 1848 lb of linoleic acid, 1465 lb of phthalic anhydride, 1170 lb of trimethylpentanediol. A nitrogen blanket was provided and the mixture was heated gently to about 80° C. When it began to melt, agitation was commenced and 698 lb of [trimethylolpentanediol] *trimethylolethane* and 6.5 lb of dibutyl tin oxide catalyst were added.

The mixture was heated slowly with agitation to 210° C. and this temperature was maintained while removing water of reaction through the take-off head until the acid value was about 52–57 and the viscosity at 125° C. was 0.8–1.2 poise. The mixture was then cooled rapidly to 160° C. and 517 lb of ethyl benzene was added. The mixture was further cooled to about 82° C. and 339 lb of methyl ethyl ketone was added. About 200 lb of trimethylpentanediol which collected in the receiver was recovered.

The mixture was further cooled to 65° C. and 730 lb of 2,4-toluene diisocyanate was slowly added over a two-hour period, maintaining the temperature at 82° C. or below. An additional 50 lb of toluene diisocyanate was added to obtain a cure. The mixture was then heated to 100°–105° C. for 1.5 hours to obtain a 35–50 sec. cure time. Butyl cellosolve (butoxyethanol) 400 lb was added to the kettle and the mixture was discharged into butoxyethanol 1024 lb and isobutyl alcohol 308 lb (46 gallons) was then added. The product was allowed to cool, then was discharged from the kettle. The viscosity of the product when cool was Gardner $Z_2$–$Z_5$, the color 9, acid value 45–50 and the product was clear. The total non-volatile component was 70%.

A red oxide, water-soluble primer was prepared from the resin in accordance with the following recipe:

| | Pounds | Gallons |
|---|---|---|
| Resin solution | 215.4 | 24.34 |
| Butoxyethanol | 50.0 | 6.66 |
| n-Butanol | 10.0 | 1.50 |
| Surfactant | 2.5 | .29 |
| Silicone flow control agent, 10% in butoxyethanol | 3.0 | .39 |
| Triethylamine | 2.0 | .22 |
| Ammonium hydroxide, 26° | 8.5 | 1.09 |
| Water | 182.5 | 21.90 |
| Drier | 3.78 | .47 |
| Defoamer | 1.5 | .20 |
| Drier additive | 1.5 | .19 |
| Red iron oxide | 100.0 | 2.40 |
| Anti-corrosive pigment | 12.5 | .54 |
| Talc | 137.5 | 5.85 |

The above mixture was dispersed to a fineness of 7.5 N.B.S. units and the following ingredients were added:

| | | |
|---|---|---|
| Resin solution | 171.2 | 19.34 |
| Triethylamine | 1.5 | .17 |
| Ammonium hydroxide, 26° | 6.0 | .68 |
| Water | 149.0 | 17.89 |
| Butoxyethanol | 10.0 | 1.33 |
| n-Butanol | 10.0 | 1.50 |
| Flow control agent | 1.7 | .24 |
| | 1080.08 | 107.19 |

The resulting product had a pH of 8.25.

EXAMPLE 2

The experiment of Example 1 is repeated in all essential details except that tall oil fatty acids are substituted for linoleic acid. There is obtained a urethane-modified alkyd resin having good anti-corrosion properties when formulated in a primer.

EXAMPLE 3

The experiment of Example 1 is repeated in all essential details except that linseed oil fatty acids are substituted for linolec acid. There is obtained a urethane-modified alkyd resin having good anti-corrosion properties when formulated in a primer.

EXAMPLE 4

The experiment of Example 1 is repeated in all essential details except that soybean fatty acids are substituted for linoleic acid. There is obtained a urethane-modified alkyd resin having good anti-corrosion properties when formulated in a primer.

EXAMPLE 5

The experiment of Example 1 is repeated in all essential details except that tung oil fatty acids are substituted for linoleic acid. There is obtained a urethane-modified alkyd resin having good anti-corrosion properties when formulated in a primer.

EXAMPLE 6

The experiment of Example 1 is repeated in all essential details except that an equivalent amount of glycerol is substituted for trimethylolethane. There is obtained a urethane-modified alkyd resin having good anti-corrosion properties when formulated in a primer.

EXAMPLE 7

The experiment of Example 1 is repeated in all essential details except that an equivalent amount of diethylene glycol is substituted for trimethylpentanediol. There is obtained a urethane-modified alkyd resin having good anti-corrosion properties when formulated in a primer.

EXAMPLE 8

The experiment of Example 1 is repeated in all essential details except that an equivalent amount of neopentylglycol is substituted for trimethylpentanediol. There is obtained a urethane-modified alkyd resin having good anti-corrosion properties when formulated in a primer.

We claim:

1. An air-drying, water-soluble, polyurethane-modified alkyd resin having superior corrosion resistance and hardness obtained by the steps of:

(a) (1) forming an alkyd resin by melting together at 175° F. a mixture of trimethylpentanediol 1170 parts, linoleic acid 1848 parts, and phthalic anhydride 1465 parts, (2) with agitation adding thereto trimethylolethane 698 parts, dimethylolpropionic acid 567 parts, and dibutyl tin oxide 6.5 parts, (3) heating the mixture slowly under a nitrogen blanket to 210° C. until an acid number of 52–57 is obtained, (4) cooling the mixture to 160° C. and adding ethyl benzene 517 parts, cooling to 82° F. and adding methyl ethyl ketone 339 parts, and cooling to 65° C., (b), adding thereto toluene diisocyanate 730 parts over a two-hour period, maintaining the temperature at 82° C. or below *adding thereto additional toluene diisocyanate 50 parts*, then heating to 100°–105° C. for about 1.5 hours, and then diluting with inert solvent.

*2. An air-drying water-soluble, polyurethane-modified alkyd resin having superior corrosion resistance and hardness obtained by the steps of:*

*(a) forming an alkyd resin by reacting at elevated temperatures a fatty acid having 10–20% conjugated unsaturation in an amount of about 30–48% by weight with an aromatic dicarboxylic acid or anhydride thereof in an amount of about 21–30%, and dimethylolpropionic acid in an amount of about 4–11% with a stoichiometrical excess amount of a polyol and*

*(b) reacting at elevated temperatures the alkyd resin so formed with toluene diisocyanate.*

*3. The alkyd resin of claim 2 wherein the fatty acid is present in an amount of 30-36%, the aromatic dicarboxylic acid or anhydride thereof is present in an amount of about 23–28% and the dimethylolpropionic acid is present in an amount of 8.5–10.5%.*

*4. The alkyd resin of claim 12 wherein the fatty acid is present in an amount of 31–33%, the aromatic dicarboxylic acid or anhydride thereof is present in an amount of 24–27% and the dimethylpropionic acid is present in an amount of 9–10%.*

*5. The alkyd resin of claim 2 wherein the polyol is supplied by trimethylpentanediol 17–24%, and trimethylolethane 11–15%.*

*6. The alkyd resin of claim 5 wherein the trimethylpentanediol is present in an amount of 19–22% and the trimethylolethane is present in an amount of 11–13%.*

*7. The alkyd resin of claim 5 wherein the trimethylpentanediol is present in an amount of 20–21%.*

*8. An air-drying, water-soluble, alkyd resin modififed by reacting the alkyd resin with toluene disiocyanate, the alkyd portion being obtained by the steps of*

*(a) reacting at elevated temperatures a fatty acid having 10–20% conjugated unsaturation in an amount of about 30–48% by wt with an aromatic dicarboxylic acid or anhydride thereof about 21–30% and trimethyl pentanediol 17–24% and*

*(b) adding a thereto trimethylolethane 11–15% and dimethylolpropionic acid 4–11% in the presence of dibutyl tin oxide catalyst and heating until an alkyd resin of acid number 52–57 is obtained.*

* * * * *